United States Patent
Müller

(10) Patent No.: US 7,336,068 B2
(45) Date of Patent: Feb. 26, 2008

(54) FIELD DEVICE AND METHOD FOR CALIBRATING A FIELD DEVICE

(75) Inventor: Alexander Müller, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 204 days.

(21) Appl. No.: 10/499,154

(22) PCT Filed: Dec. 11, 2002

(86) PCT No.: PCT/EP02/14033

§ 371 (c)(1),
(2), (4) Date: Jul. 25, 2005

(87) PCT Pub. No.: WO03/052358

PCT Pub. Date: Jun. 26, 2003

(65) Prior Publication Data

US 2006/0167644 A1     Jul. 27, 2006

(30) Foreign Application Priority Data

Dec. 18, 2001   (DE)   ................................. 101 62 334

(51) Int. Cl.
*G01R 35/00* (2006.01)
*G01R 33/07* (2006.01)
*G01B 7/14* (2006.01)

(52) U.S. Cl. .................. 324/202; 324/244; 324/207.2; 324/251

(58) Field of Classification Search ........ 324/173–174, 324/202, 244, 251, 260, 207.2, 74, 130; 73/1.01, 73/1.41

See application file for complete search history.

(56) References Cited

U.S. PATENT DOCUMENTS

| 5,756,876 | A | | 5/1998 | Wetzel et al. |
| 6,043,648 | A | * | 3/2000 | Menke et al. ............ 324/244.1 |

FOREIGN PATENT DOCUMENTS

| CN | 126 7832 | 9/2000 |
| DE | 42 03 967 A1 | 8/1993 |
| DE | 42 32 720 C1 | 3/1994 |
| DE | 196 51 362 C1 | 6/1998 |
| DE | 298 21 808 U1 | 2/2000 |
| JP | 62-235529 | 10/1987 |
| JP | 63-150627 | 6/1988 |
| JP | 11257949 A | 9/1999 |

* cited by examiner

*Primary Examiner*—Bot LeDynh
(74) *Attorney, Agent, or Firm*—Bacon & Thomas, PLLC

(57) ABSTRACT

The invention relates to a field device and a method for calibrating a field device, having a field device electronics and a sensor unit for process measurements, wherein the field device electronics receives measurement signals of the sensor unit, wherein the field device electronics includes an evaluation unit for evaluating the measurement signals and means for calibrating the field device. According to the invention, the means for calibrating the field device includes a digital adjusting element and a microprocessor, wherein the digital adjusting element is driven by the microprocessor for calibrating the field device.

12 Claims, 3 Drawing Sheets

FIELD DEVICE AND METHOD FOR CALIBRATING A FIELD DEVICE

FIELD OF THE INVENTION

The invention relates to a field device having a field device electronics and a sensor unit for process measurements, wherein the field device electronics receives measurement signals of the sensor unit, and wherein the field device electronics includes an evaluation unit for evaluating the measurement signals and means for calibrating the field device and to a method for calibrating a field device,

BACKGROUND OF THE INVENTION

In the case of field devices having a field device electronics and conductive or capacitive sensor units, it is necessary in the case of extreme field conditions to conduct a calibration of the sensitivity of the field device using a potentiometer, wherein especially a switching threshold of an evaluation electronics is adjusted using the potentiometer. The direction in which the switching threshold is changed depends on whether the field device is being operated in a "MIN" type of operation as pump protection, i.e. warning when a predetermined fill level is subceeded, i.e. fallen below, or in a "MAX" type of operation as overflow protection, i.e. warning when a predetermined fill level is exceeded. The calibration is then always performed, when an indicated sensor state, due to field conditions (accretion, etc.), does not agree with the actual sensor state.

In the case of practically all previously marketed sensor units for fill level determination in liquids and bulk goods, such as work on the basis of capacitance measurements or conductivity measurements, sinusoidal electrical alternating voltage signals are used as drive signals for the sensor units. Concurrently, the alternating signals also serve directly as measurement signals. These alternating signals are normally produced by means of an analog oscillator and, for further processing, analog filtered, rectified, and, in the case of limit level switches, compared by means of analog comparators with predetermined threshold values. Microprocessors are, as a rule, only used to linearize, scale, and provide the signals, prepared by means of analog electronics, with time delays, switching hystereses, or inversions.

SUMMARY OF THE INVENTION

An object of the invention is to provide a field device which can be calibrated easily, especially also in the case where the field device is built with a hermetically sealed housing, and to provide a method for calibrating the field device.

The object is achieved according to the invention, with reference to the field device, in that the means for calibrating the field device includes a digital adjusting element and a microprocessor, wherein, for calibrating the field device, the digital adjusting element is driven by the microprocessor: and in that in a first method step an operation type of the field device is determined by field device electronics in a second method step the desired state of a condition signal is determined by the field device electronics, wherein, depending on the determined operation type and the determined desired state, in a third method step, a sensitivity of the field device is changed until a toggling of the condition signal is obtained, and wherein the desired state of the condition signal represents the actual sensor state.

A main idea of the invention is to provide a means in the form of a digital adjusting element for calibrating the field device, with the element being driven by a microprocessor. The idea of the invention is implemented especially advantageously, when a microprocessor is already part of the field device electronics, since such microprocessor can be used for the calibration.

The calibration using a microprocessor and a digital adjusting element is especially advantageous for field devices whose housings are hermetically sealed, so that no access is possible for a manual, trimming potentiometer.

In one advantageous embodiment of the invention, the digital adjusting element acts by suitable signals on the evaluation unit and/or on a signal producing component in the field device, wherein the action of the digital adjusting element is, for example, to adjust a threshold value in the evaluation unit or an amplification factor in the signal producing component.

In an additional embodiment of the invention, the evaluation unit includes a comparator, which can be embodied as an analog circuit or as a programmed function block, and produces a condition signal on the basis of a comparison of the measured signal with a desired value, with the desired value being produced by the microprocessor by way of the digital adjusting element.

In an advantageous further development of the invention, the calibration is initiated by a switching element, which is actuated contactlessly from outside of the field device housing. The actuation occurs in this further development, for example, by changing a magnetic field. The switching element is, for example, embodied as a reed relay or as a Hall sensor, and the associated actuation element as a permanent magnet. This embodiment has the advantage, that it can be implemented at favorable cost.

For protecting against accidental start-up of the calibration process, a time window is provided, within which a predetermined actuation procedure, for example actuating twice, or actuating for a certain length of time, must be carried out, in order to initiate the calibration process.

In another further development of the invention, the interface between the actuating element and the switching element is embodied as a transmitting/receiving element for a wireless data exchange of inductive, optical or electromagnetic signals between the actuating element and the switching element, wherein the actuating element can be embodied as a memory card.

Thus, the interface between switching element and actuating element can, for example, be embodied as a transponder arrangement for inductive data transfer using a transmitting coil and a receiving coil, wherein the actuating element includes the transmitting coil and the switching element includes the receiving coil.

Additionally, the interface can be embodied as an infrared interface for optical transmission or as a radio interface, for example using the Blue-Tooth protocol, with the transmitting unit being part of the actuating element and the receiving unit part of the switching element.

If the switching element for initiating the calibration process is actuated over an air interface, it is advantageously possible to initiate different calibration processes by differently coded signals, and/or to make the initiation dependent on a certain code, so that no unauthorized manipulation or accidental start-up of the calibration process is possible.

The method of the invention for calibrating the field device includes, in a first method step, the determining of an operation type in which the field device is being operated. In an especially advantageous embodiment of the method, the field device electronics determines the operating type by evaluating the connector assignments of the field device.

The field device can be operated in a first operation type "MIN" as pump protection, i.e. a warning occurs, when a predetermined fill level is subceeded, or in an operation type "MAX" as overflow protection, i.e. a warning occurs, when a predetermined fill level is exceeded.

In a second method step, the field device electronics determines a desired state of the sensor, with the desired state being determined by means of a logical coupling between the signal representing the operation type of the field device and the signal representing the starting state of the condition signal and the fact that a calibration process was started.

In the determining of the desired state of the sensor, it is assumed that the actual state of the sensor is not represented by the starting state of the condition signal, since a calibration process was started manually from outside the field device, so that the starting state of the condition signal must be changed such that the desired state of the condition signal establishes itself, to represent the actual condition of the sensor.

A calibration process is always initiated, when an indicated sensor state corresponding to the starting state of a condition signal, due to the field conditions (accretion, etc.), does not agree with the actual sensor state.

For protecting against accidental start-up of the calibration process, one embodiment of the method requires that the actuating element actuate the switching element twice within a predetermined time span, in order to start the calibration process. Of course, other actuation scenarios are conceivable for starting the calibration process, for example an actuation of the switching element by the actuating element for a predetermined period of time.

Depending on the determined type of operation and the determined desired state of the condition signal, a sensitivity of the field device is changed in a third method step until a toggling of the condition signal is noted.

The sensitivity of the field device is increased, for example by decreasing a threshold value for the comparator, or an amplification factor is increased in the case of producing the measurement signal in the signal producing component. Analogously, the sensitivity of the field device is decreased by increasing the threshold value for the comparator or by decreasing the amplification factor of the measurement signal.

BRIEF DESCRIPTION OF THE DRAWINGS

The invention will now be explained in greater detail on the basis of the drawings, whose figures show as follows.

DETAILED DESCRIPTION OF THE PREFERRED EMBODIMENT

Figure 1:
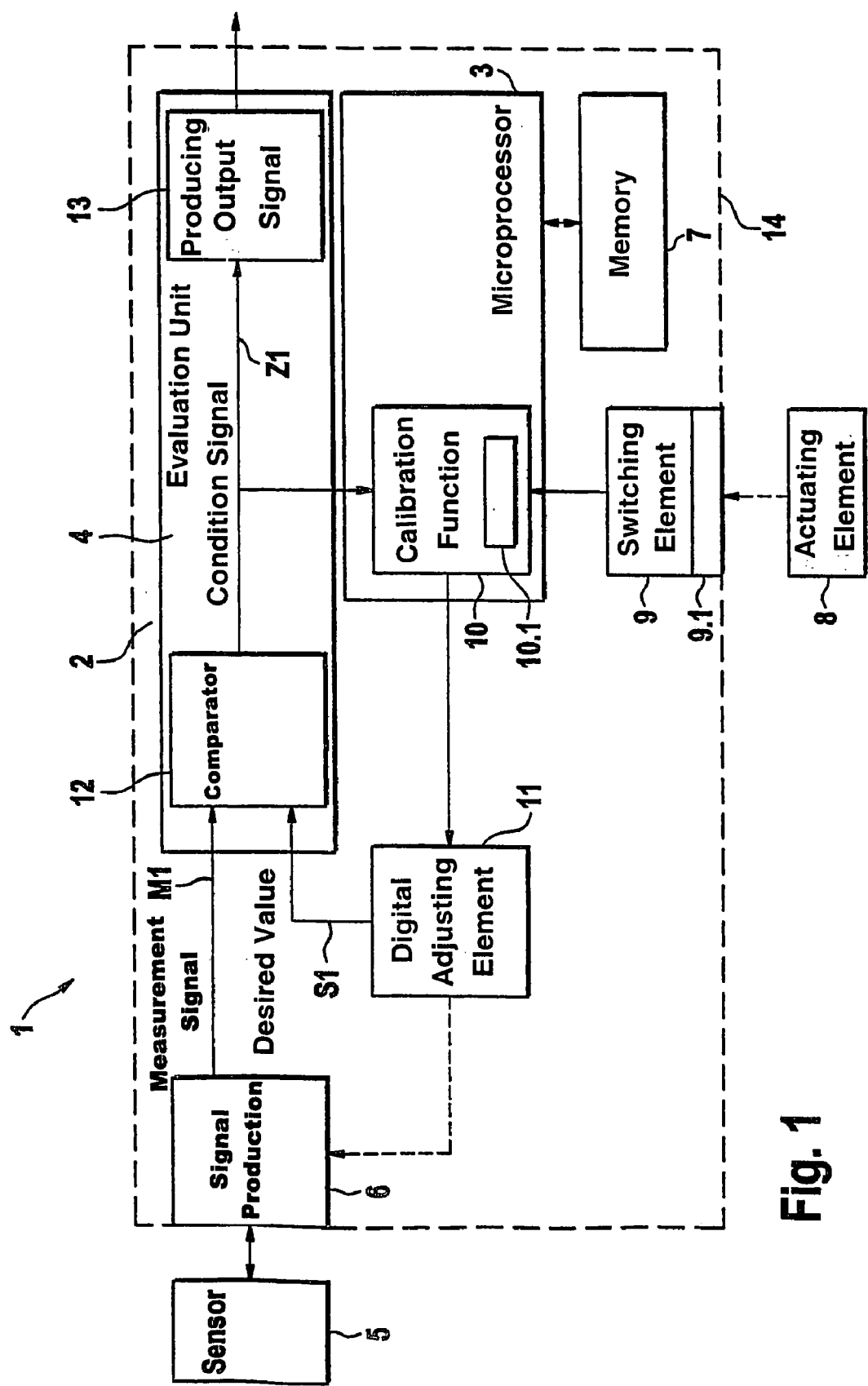
FIG. 1: Block circuit diagram of a first embodiment of the field device of the invention.

As can be seen in FIG. 1, the field device 1 includes a field device electronics 2 and a sensor unit 5 for determining and/or monitoring a fill level of a medium in a container (not shown), with the sensor unit 5 being embodied, for example, as a capacitive or conductive probe. The field device electronics 2 includes a microprocessor 3, an evaluation unit 4, a signal producing unit 6, a memory unit 7, a digital adjusting element 11 and a switching element 9, with an actuating element 8 actuating the switching element 9 contactlessly from outside of the housing 14 of the field device electronics. In the illustrated embodiment, the housing 14 is hermetically closed, and the contactless actuation occurs by changing a magnetic field, with the switching element 9 being, for example, a reed relay or a hall sensor, and the associated actuating element 8 a permanent magnet. A interface 9.1 is provided in the illustrated embodiment, such that a certain distance of the switching element 8 to the housing 14 is not exceeded. The interface 9.1 can, however, be embodied as something more complex, such as, for example, a transmitting/receiving unit for a wireless data exchange of inductive, optical or electromagnetic signals between the actuating element 8 and the switching element 9. The illustrated evaluation unit 4 includes a comparator 12 and a unit 13 for producing an output signal, with the comparator 12 being embodied as an analog circuit and producing a condition signal Z1 as a function of a comparison of a measurement signal M1, produced by the signal producing unit, with a desired value S1 produced by the digital adjusting element, with the desired value SI being produced by the microprocessor by way of the digital adjusting element. The condition signal Z1 can assume two states and represents either the condition "free", i.e. the sensor is not covered by a medium, or the condition "covered", i.e. the sensor is covered by a medium.

Depending on the actual state of the condition signal Z1, the unit 13 for producing an output signal produces a corresponding output signal, with the unit 13 for producing an output signal performing a required conditioning of the output signal for forwarding to a superordinated unit. The output signal produced depends on the further use of the output signal, respectively on the transmission protocol being used. Thus, for example, a 4-20 mA-signal, a 0-10V-signal, a PFM-signal (pulse frequency modulation signal), a binary switching signal, or a digital code, etc. can be produced. It is, however, conceivable that a plurality of output signals (4-20 mA, 0-10V, PFM signal, binary switching signal, etc.) for different transmission protocols, respectively application purposes, be produced and output.

The digital adjusting element 11 is, for example, a digital/analog converter, which converts the digital, desired value from the microprocessor 3 into an analog desired value S1. For calibrating the field device 1, the microprocessor executes a calibration function 10, with the calibration function 10 being stored in the memory unit 7 as a program which can be run in the microprocessor 3. As part of the calibration function 10, the desired value S1 is changed by way of the digital adjusting element 11 and stored in a desired value memory 10.1. It is, however, also possible to change an amplification factor (dashed line in FIG. 1) in the signal producing unit 6. The changing of the desired value depends on the state of the condition signal and on the type of operation in which the field device is being operated. The type of operation of the field device depends on the hookup of the sensor unit 5 with the field device electronics 2, i.e. how the sensor unit 5 is connected with the signal producing unit 6. The field device can be operated in an operation type "MIN" as pump protection, i.e. warning when a predetermined fill level is subceeded, or in an operation type "MAX" as overflow protection, i.e. warning when a predetermined fill level is exceeded.

Figure 2:
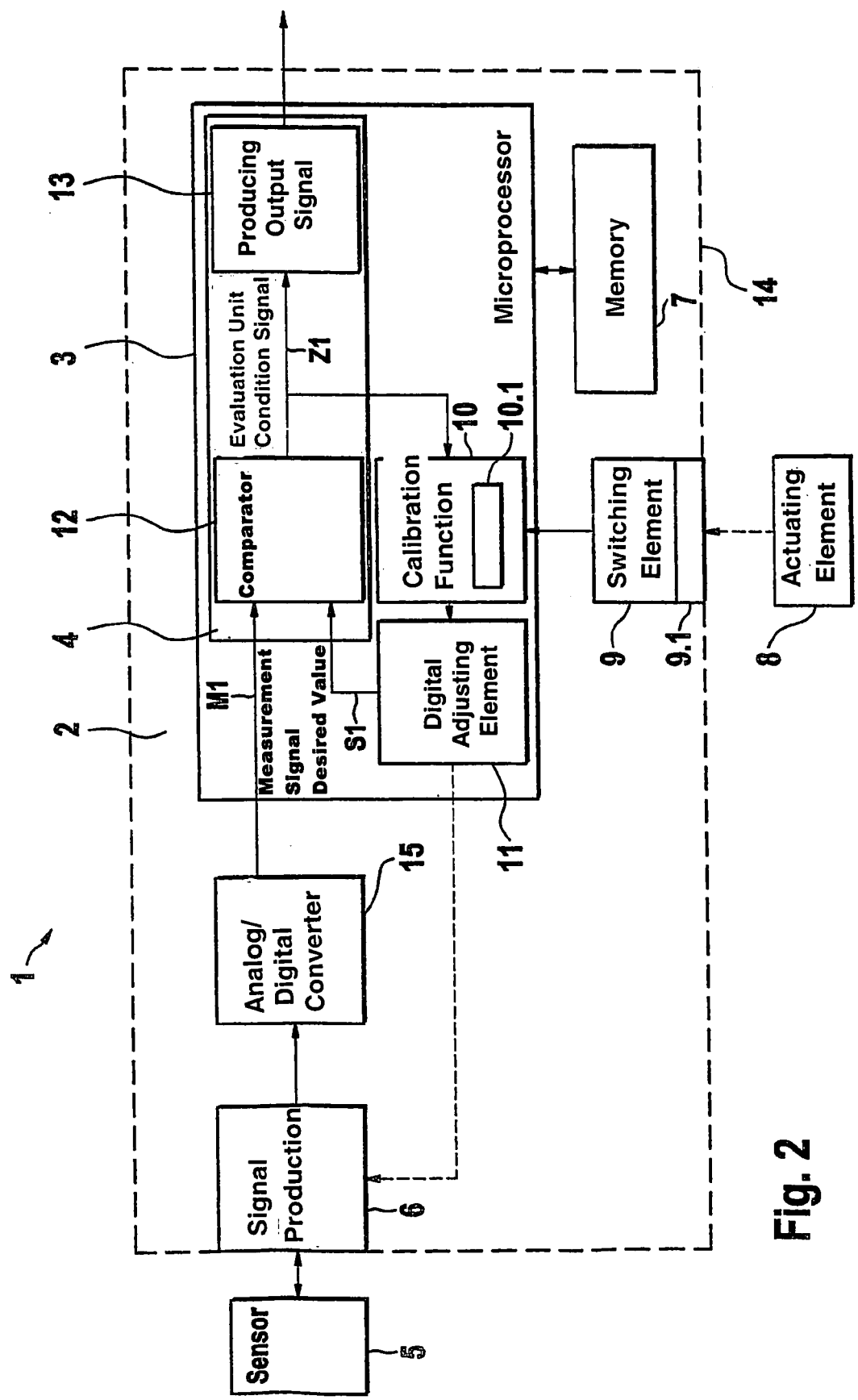
FIG. 2: Block circuit diagram of a second embodiment o the field device of the invention.

FIG. 2 shows, by way of example, as a second embodiment, a variation of the embodiment of FIG. 1. Different compared to the first embodiment is that the evaluation unit 4 with comparator 12 and unit 13 for producing an output signal 13 and the digital adjusting element 11 are additionally implemented as functions executable by the microprocessor, with the associated, executable programs likewise being stored in the memory unit 7. Present as a new unit is an analog/digital converter 15, which converts the analog measurement signal produced in the signal producing unit 6 into a digital measurement signal M1 for processing in the microprocessor. For the manner in which the individual units function, reference is made to the descriptions of FIG. 1.

Figure 3:
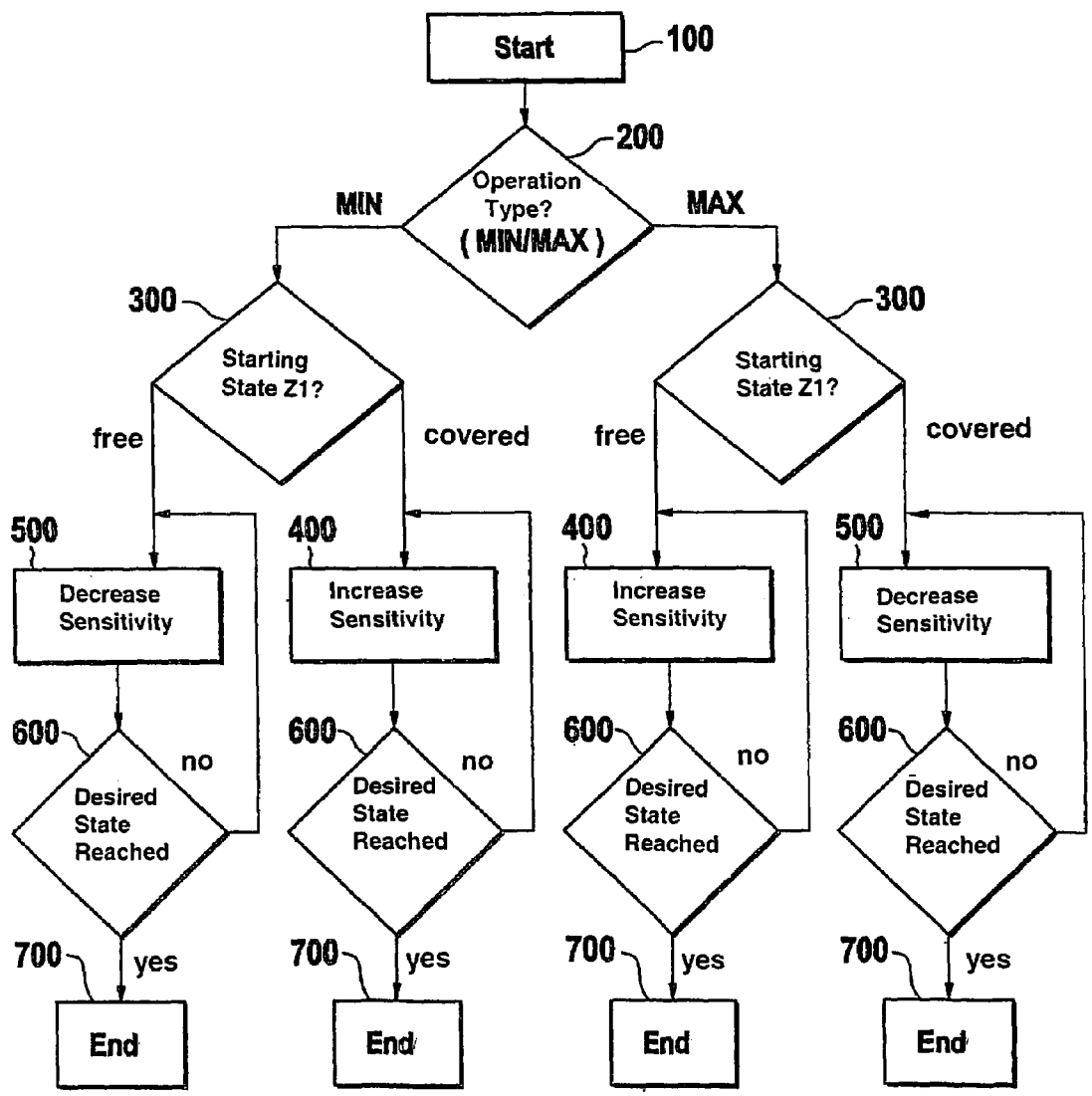
FIG. 3: Flow chart of the method of the invention.

As shown in FIG. 3, following a manually initiated start 100 of the calibration process, the type of operation of the field device is determined 200. Depending on the determined type of operation (MIN or MAX), the method branches, with both branches then determining 300 the starting state of the condition signal Z1. Depending on the determined starting state of the condition signal Z1, the sensitivity of the field device is next increased 400, or decreased 500, in a loop, and the new value stored. If in a query 600 it is noted that the desired state of the condition signal Z1 has been reached, then the calibration process is ended 700. If the desired value is not yet reached, then the sensitivity is again changed 400, 500, until the desired state of the condition signal is reached. For changing the sensitivity, the desired value S1 of the comparator and/or the amplification factor for the measurement signal M1 is changed, with the desired value S1 being lessened, respectively the amplification factor increased, for increasing the sensitivity, and with the desired value S1 being increased, respectively the amplification factor decreased, for decreasing the sensitivity.

The following scenarios are possible for the method:

In the operation type "MAX", the starting state of the condition signal is "free", while the actual state of the sensor is "covered", i.e. the desired state of the condition signal is "covered". Since a false state is shown, this must be changed by the calibration process. By manual initiation of the calibration process, the sensitivity is decreased until the comparator toggles and the desired state of the condition signal is reached.

In the operation type "MAX", the starting state of the condition signal is "covered", while the actual state of the sensor is "free", i.e. the desired state of the condition signal is "free". Since a false state is shown, this must be changed by the calibration process. By manual initiation of the calibration process, the sensitivity is increased until the comparator toggles and the desired state of the condition signal is reached.

In the operation type "MIN", the starting state of the condition signal is "free", while the actual state of the sensor is "covered", i.e. the desired state of the condition signal is "covered". Since a false state is shown, this must be changed by the calibration process. By manual initiation of the calibration process, the sensitivity is decreased until the comparator toggles and the desired state of the condition signal is reached.

In the operation type "MIN", the starting state of the condition signal is "covered", while the actual state of the sensor is "free", i.e. the desired state of the condition signal is "free". Since a false state is shown, this must be changed by the calibration process. By manual initiation of the calibration process, the sensitivity is increased until the comparator toggles and the desired state of the condition signal is reached.

The invention claimed is:

1. A field device having a field device electronics; and a sensor unit for process measurements, wherein:

said field device electronics receives measurement signals from said sensor unit;

said field device electronics includes an evaluation unit for evaluating the measurement signals, and means for calibrating the field device, said means for calibrating the field device includes a digital adjusting element and a microprocessor, and for calibrating the field device, said digital adjusting element is driven by said microprocessor.

2. The field device as defined in claim 1, wherein:

in calibration of the field device, said digital adjusting element acts, by suitable signals, on said evaluation unit and/or on a measurement signal production.

3. The field device defined in claim 2, wherein:

said evaluation unit includes a comparator which products a condition signal (Z1) as a function of a comparison of the measurement signal (Ml) with a desired value (S1), and wherein the desired value (S1) is produced by said digital adjusting element.

4. The field device as defined in claim 2, wherein:

the action of said digital adjusting element on the measurement signal production includes an amplification change.

5. The field device as defined in claim 2, wherein:

calibration is initiated by a switching element which is actuated contactlessly from outside.

6. The field device as defined in claim 5, wherein:

said switching element is a reed relay, which is actuated from the outside by a magnet.

7. The field device as defined in claim 5, wherein:

said switching element is a Hall sensor, which is actuated from the outside by a magnet.

8. The field device as defined in claim 5, wherein:

the interface between aid actuating element and said switching element is embodied as a transmitting /receiving unit for a wireless data exchange between a id actuating element and said switching element.

9. The field device as defined in claim 8, wherein:

the interface between said switching element and said actuating element is embodied as a transponder arrangement for inductive data transfer with a transmitting coil and a receiving coil, and said actuating element includes said transmitting coil and the switching element includes said receiving coil.

10. The field device as defined in claim 8, wherein:

the interface is embodied as an infrared interface or as a radio interface, and said transmitting unit is part of said actuating element and said receiving unit is part of said switching element.

11. The field device as defined in claim 8, wherein:

said actuating element is embodied as a memory card.

12. A method for calibrating a field device, comprising the steps of:

determining an operation type of the field device by a field device electronics;

determining a desired state of a condition signal (Z1) by the field device electronics, depending on the determined operation type and the determined desired state;

changing the sensitivity of the field device until a toggling of the condition signal (Z1) is obtained, wherein the desired state of the condition signal (Z1) represents the actual sensor state.

* * * * *